United States Patent [19]

Kuroyanagi et al.

[11] Patent Number: 4,627,793

[45] Date of Patent: Dec. 9, 1986

[54] MOTOR-DRIVEN RADIAL PLUNGER PUMP

[75] Inventors: Masatoshi Kuroyanagi, Kariya; Masahiko Suzuki; Yasuhiro Horiuchi, both of Aichi; Kazuma Matsui, Toyohashi; Kouichi Moriguchi, Nagoya; Yukio Hashimoto, Kariya, all of Japan

[73] Assignee: Nippondenso Co., Ltd., Kariya, Japan

[21] Appl. No.: 738,649

[22] Filed: May 28, 1985

[30] Foreign Application Priority Data

Jun. 13, 1984 [JP] Japan ............... 59-122799
Jun. 25, 1984 [JP] Japan ............... 59-131430

[51] Int. Cl.⁴ ............... E04B 23/14; F15B 21/04
[52] U.S. Cl. ............... 417/203; 417/271; 92/78
[58] Field of Search ............... 417/271, 372, 203; 92/78

[56] References Cited

U.S. PATENT DOCUMENTS

| 1,082,183 | 12/1913 | Vernon | 417/410 |
|---|---|---|---|
| 1,549,254 | 8/1925 | Hunt | 417/410 |
| 1,846,360 | 2/1932 | Rudolph | 417/271 |
| 2,293,693 | 8/1942 | Wylie | 417/203 |
| 2,453,266 | 11/1948 | Rockwell | 417/203 |
| 2,457,101 | 12/1948 | Horton | 417/203 |
| 2,517,367 | 8/1950 | Winkler | 417/271 |
| 2,864,551 | 12/1958 | Heidorn et al. | 417/271 |
| 3,511,135 | 5/1970 | Ife et al. | 91/497 X |
| 3,782,245 | 1/1974 | Aldinger | 91/498 |
| 4,141,328 | 2/1979 | Tipton | 417/271 |

Primary Examiner—William L. Freeh
Assistant Examiner—Paul F. Neils
Attorney, Agent, or Firm—Cushman, Darby & Cushman

[57] ABSTRACT

A motor-driven radial plunger pump has an outer housing enclosing a motor section and a pump section drivingly connected thereto. The motor section has a motor housing cooperating with the outer housing to define a fluid passage having a fluid inlet adjacent to a part of the motor housing in which a brush unit is disposed. The fluid passage contains a filter element and has a recess disposed upstream thereof and adjacent to motor magnets so that magnetic particles contained in the fluid flow are magnetically adhered to and deposited on the bottom of the recess. The pump section has a rotor with radial plungers slidably disposed in cylinder bores in the rotor. The cylinder bores have radially inner end successively communicated with a suction passage communicated with the fluid passage between the outer and motor housings through feed holes formed in a coupling disc plate drivingly connecting the motor with the rotor. The feed holes each have a trailing side providing a face extending an angle of attack relative to the plane of the coupling disc plate whereby, when the disc plate is rotated with the rotor, the feed holes operate to positively feed the fluid into the suction passage.

9 Claims, 8 Drawing Figures

MOTOR-DRIVEN RADIAL PLUNGER PUMP

FIELD OF THE INVENTION

The present invention relates to a motor-driven radial plunger pump suited for use as, but not restrictively, an electrically operated oil pump for an automotive powered steering system.

DESCRIPTION OF THE PRIOR ART

A typical prior art motor-driven radial plunger pump was formed by electric motor section and pump section separably assembled together. More specifically, the motor section has an armature supported by bearings such that, if the pump section is disconnected from the motor section, the motor section itself can be electrically driven. The pump section has a rotor which is also supported by bearings so that, when the pump section is disconnected from the motor section, the rotor can be driven by another rotatably driving means to provide a pumping operation.

With such arrangement of the prior art radial plunger pump, however, a very high and strict working precision was required to assure correct alignment of the axis of the motor section with that of the pump section because the motor and pump sections had to be prepared separately and thereafter assembled and connected together. The prior art pump also had a reservoir or so-called "tank" for a working fluid such as oil. The oil tank increased the size or bulk of the pump with a resultant difficulty in the installation of the pump in a limited space in an engine compartment of an automobile.

The prior art had an additional problem of heat produced in the pump section when electrically energized. This problem becomes serious in the case where it is intended to reduce the motor size to reduce the pump size and supply a strong electrical current to the small-sized motor so as to obtain a large output. In an attempt to solve the problem, a fan was provided for the motor section to introduce cooling air thereinto. This attempt, however, is adverse to the intention to reduce the size of the motor section.

Moreover, when the viscosity of the working fluid is high, e.g., when the fluid is at a low temperature or immediately after the pump operation has been started, a high load is applied from the pump section to the motor section with a resultant increase in the motor temperature.

SUMMARY OF THE INVENTION

It is an object of the present invention to provide a motor-driven radial plunger pump in which the motor section is efficiently cooled and the temperature rise of the working fluid is facilitated and which neverthless is of a compact design.

The motor-driven radial plunger pump according to the present invention includes an outer housing provided with fluid inlet and outlet; a motor section including an electric motor and a motor housing so disposed in the outer housing as to cooperate therewith to define therebetween a fluid passage communicated with the fluid inlet; and a pump section including a pump housing disposed in the outer housing, a rotor disposed in the pump housing, a coupling member drivingly coupling the motor to the rotor, a plurality of radial cylinder bores in the rotor, plungers disposed in the cylinder bores for sliding movement therein, respectively, so that the radially inner ends of the plungers cooperate with associated cylinder bores to define variable volume chambers, a suction passage means communicated with the fluid passage and adapted to be communicated with successive variable volume chamebers when in suction strokes, and a discharge passage communicated with the fluid outlet in the outer housing and adapted to be communicated with successive variable volume chambers when in discharge strokes. The fluid inlet in the outer housing may preferably be so disposed as to introduce a working fluid into the fluid passage adjacent to a part of the motor housing in which a brush unit of the electric motor is disposed.

The outer housing acts as a tank for the working fluid. This feature contributes to a reduction in the size or bulk of the pump. The provision of the fluid passage between the pump housing and the outer housing or fluid tank not only facilitates efficient cooling of the motor section, and particularly, the part of the motor housing in which the motor brush unit is disposed, but also assures a quick temperature rise of the working fluid with a result that the viscosity of the working fluid is lowered to reduce the load on the motor section whereby the operations of the motor and pump sections become smooth soon after cold-starting of the pump apparatus.

According to one perferred embodiment of the invention, the coupling member is so shaped as to provide feed holes disposed between the fluid passage and the suction passage and rotatable with the rotor. Each feed passage may preferably be provided with means for positively feeding the working fluid from the fluid passage into the suction passage to prevent cavitation which tends to occur in the prior art pump when the rotor thereof is rotated at a high speed.

According to another preferred embodiment of the invention, the pump is provided with means in the fluid passage for removing, by the magnetic force of magnets of the motor section, magnetic particles contained in the flow of the working fluid through the fluid passage. An additional filter element may preferably be disposed in the fluid passage downstream of the magnetic particle removing means.

The above and other objects, features and advantages of the present invention will be made more apparent by the following description with reference to the accompanying drawings.

DESCRIPTION OF THE PREFERRED EMBODIMENTS

Figure 1:
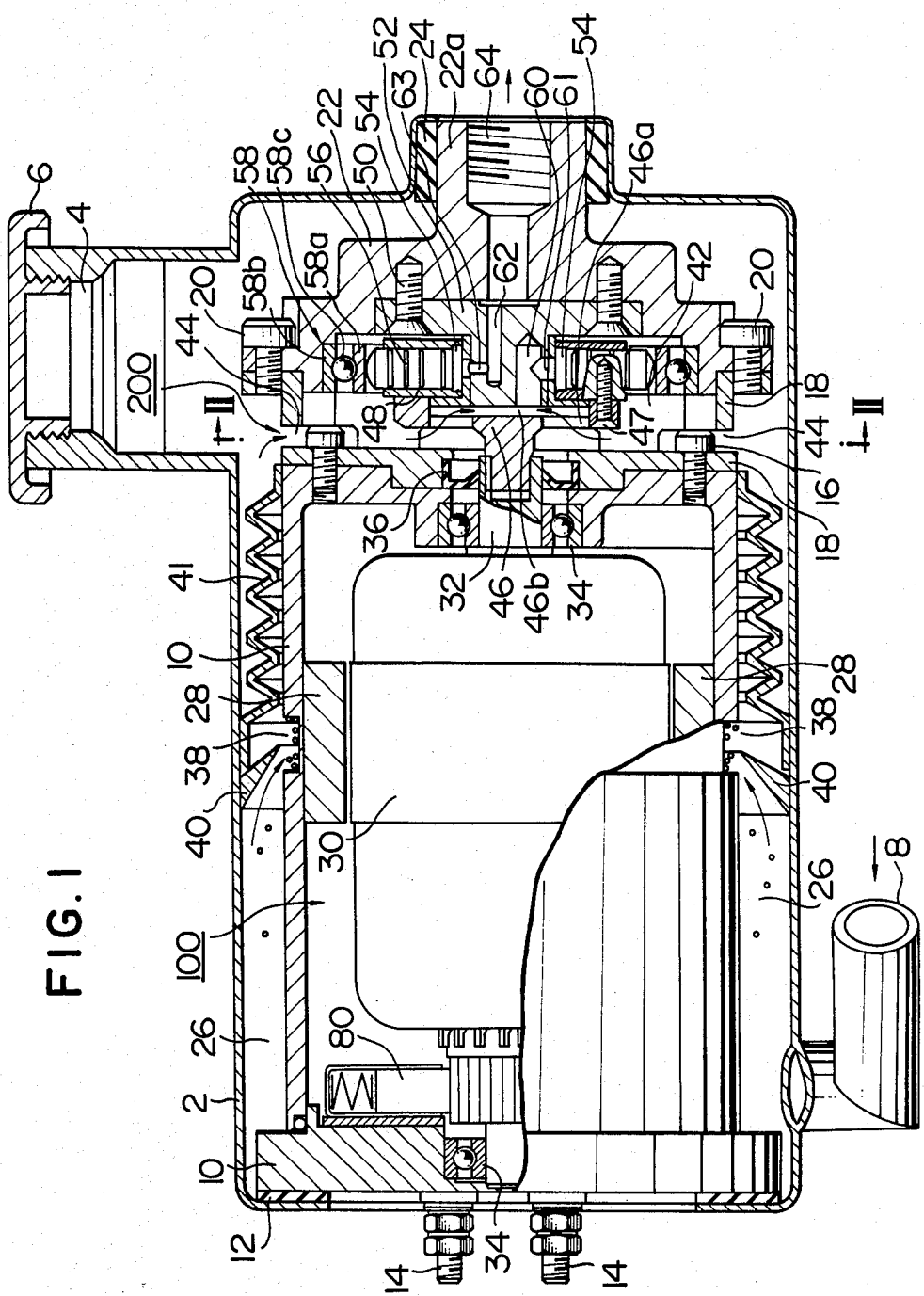
FIG. 1 is an axial section of an embodiment of a motor-driven radial plunger pump according to the present invention.

A motor-driven radial plunger pump includes a generally cylindrical tank or outer housing 2 having an upwardly projecting oil-supply port 4 normally closed by a removable cap 6. An oil inlet port 8 is provided in the bottom of the outer housing 2. The housing 2 encloses a motor section 100 and a pump section 200.

The motor section 100 comprises a conventional D.C. motor including a motor housing 10 secured by bolts (not shown) to the left end (as viewed in FIG. 1) of the outer housing 2 with a seal ring 12 of rubber interposed therebetween. The left end (as viewed in FIG. 1) of the motor section 100 is provided with electric terminals 14 to electrically connect the motor section with an electric power source (not shown).

The motor housing 10 defines the outer profile of the motor section 100 and carries a plurality of permanent magnets 28 secured to the inner peripheral surface of the motor housing 10. An armature 30 having a coil wound thereon is disposed radially inwardly of the magnets 28 and has a motor shaft 32 fixed to the armature for rotation therewith. The motor shaft 32 is rotatably supported by bearings 34 secured to the motor housing 10. One end of the motor shaft 32 is drivingly connected to a coupling disc plate 46 of the pump section. An annular seal member 36 is provided in sliding engagement with the outer periphery of the end of the motor shaft 32 to seal the interior of the pump section 100 from the working fluid or oil in the pump section 200.

The tank or outer housing 2 and the motor housing 10 cooperate to define therebetween an annular fluid passage 26 axially extending substantially from the left end of the motor housing 10 to the pump section 200. In the outer peripheral surface of the motor housing 10 adjacent to the magnets, a recess or groove 38 is formed to extend around at least a part of the periphery of the motor housing 10. A guide plate 40 is secured to the inner peripheral surface of the outer housing 2 adjacent to the groove 38 so that the oil flowing through the fluid passage 26 is guided to flow into and out of the groove 38. A generally cylindrical filter element 41 having accordion pleats is disposed in the fluid passage 26 downstream of the groove 38 and has axially opposite ends secured to the outer housing 2 and to the motor housing 10, respectively, so that oil is caused to pass through the pleats of the filter element 41.

The depth or the radial dimension of the groove 38 is determined on the basis of consideration of the strength of the magnetic force produced by the magnets 28. The arrangement should preferably such that the magnetic fluid produced by the magnets 28 is saturated at the bottom of the groove 38.

The motor section 100 includes a conventional brush unit 80 disposed adjacent to the left end of the motor housing, as viewed in FIG. 1. The oil inlet port 8 is positioned to introduce the oil into the fluid passage 26 adjacent to the part of the motor section 100 where the brush unit 80 is provided so that the heat generated in the brush unit 80 can be cooled by the oil sucked into the outer housing 2.

The pump section 200 includes a rear housing part 18 secured to the motor housing 10 by means of bolts 16. A front pump housing part 22 is secured to the rear housing part 18 by means of bolts 20 and has a generally cylindrical central projection 22a extending axially outwardly and fixed to the right end of the outer housing 2 by means of an annular sealing rubber 24 interposed therebetween. The rear pump housing part 18 is formed therein with four circumferentially spaced openings 44 which communicate the fluid passage 26 in the outer housing with an oil chamber 42 defined in the rear housing part 18.

The coupling disc plate 46 mentioned previously is disposed in the oil chamber 42 and is formed therein with a plurality of circumferentially spaced feed holes 46a (to be best seen in FIG. 2) and an axially shallow circular space 46b communicated with the feed holes 46a. The coupling disc plate 46 is secured by bolts 47 to a rotor 48 so that the rotation of the motor shaft 32 is transmitted through the coupling disc plate 46 to the rotor 48.

Figure 2:
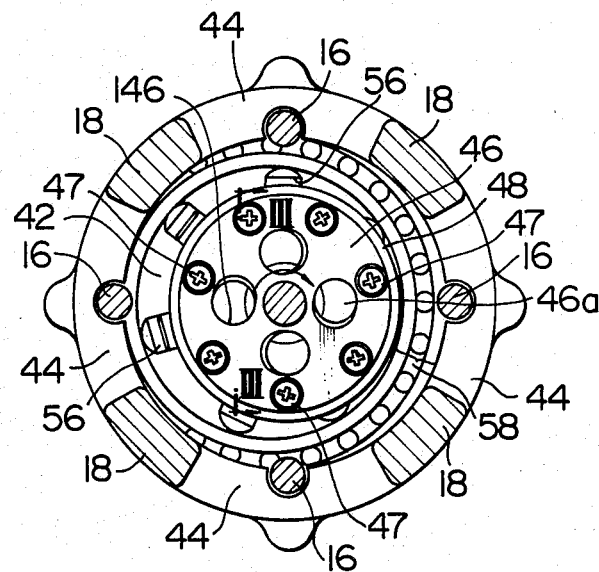
FIG. 2 is a sectional view of a pump section taken along line II—II in FIG. 1.
Figure 3:
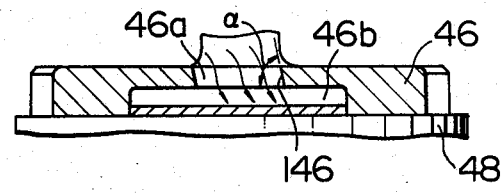
FIG. 3 is an enlarged fragmentary sectional view of the pump section taken along line III—III in FIG. 2.

Referring particularly to FIGS. 2 and 3, the feed holes 46a formed in the coupling disc plate 46 have their axes each inclined an angle α relative to the plane of the coupling disc plate 46. More specifically, the trailing side 146 of the inner peripheral surface of each of the feed holes 46a, as viewed in the direction (clockwise in FIG. 2) of rotation of the coupling disc plate 46 is at an angle of attack α relative to the plane of the plate 46 so that, when the plate is rotated clockwise as viewed in FIG. 2, the feed holes 46a provide a pumping operation to force the oil through the holes into the space 46b.

The front and rear housing parts 18 and 22 cooperate to define an enclosure in which the rotor 48 is disposed and rotatably supported on a pintle 52 which is secured by bolts 50 to the inner surface of the front pump housing part 22. The rotor 48 is formed therein with a plurality of radial cylinder bores 54 in which plungers 56 are disposed in sealing and slidable engagement with the inner surfaces of the cylinder bores 54, respectively. Each plunger 56 is radially outwardly biased by a spring member (not shown). A guide ring 58 is disposed between the inner peripheral surface of the front pump housing part 22 and the outer ends of the plungers 56 and arranged in eccentric relationship to the pintle 52. The guide ring 58 comprises inner and outer races 58a and 58b and steel balls 58c disposed therebetween.

The pintle 52 is formed therein with an axial suction passage 60 communicated with the space 46b and a notch 61 communicated with the passage 60 and extending substantially over the lower half of the outer periphery of the pintle 52. The rotation of the rotor 48 brings the cylinder bores 54 successively into suction strokes in which the cylinder bores 54 are communicates with the suction passage 60 through the notch 61.

The pintle 52 is further formed therein with a discharge passage 62 communicated with a discharge port 64 formed in the front pump housing part 22. A discharge notch 63 is formed in and extends substantially over the upper half of the outer periphery of the pintle 52 to communicate the discharge passage 62 with successive cylinder bores 54 when in discharge strokes.

In operation, when the motor section 100 is electrically energized, the armature 30 is rotated with the motor shaft 32 to rotate the coupling disc plate 46 and the rotor 48 of the pump section 200. The oil is thus sucked through the oil inlet port 8 into the passage 26 and flows therethrough. The guide plate 40 causes the oil to flow into and out of the groove 38. At this time, relatively large foreign particles such as iron particles in the oil are deposited in the groove 38 and removed from the oil. The oil then flows through the filter element 41 disposed downstream of the groove 38 to remove small foreign matters that have not been removed by the groove 38, so that cleaned oil is sucked into the oil chamber 42 in the pump section 200 through the openings 44 in the rear pump housing part 18.

In the pump section 200, the oil flows from the oil chamber 42 through the feed holes 46a, the space 46b, the suction passage 60 and the notch 61 into the cylinder bores 54 when in suction strokes. The words "suction stroke" mean a position of each cylinder bore in which the plunger 56 is moved by the rotation of the rotor into a position in which the spring (not shown) associated with the plunger is allowed by the guide ring 58 to resiliently force or urge the plunger radially outwardly to increase the volume in the cylinder bore 54 radially inward of the plunger 56. The rotor 48 is rotated continuously to bring successive cylinder bores 54 into disccharge strokes in which the plungers are radially inwardly moved by the guide ring 58 to decrease the cylinder volumes. Accordingly, the oil is pressurized in each cylinder bore in the discharge stroke and thus is discharged form the cylinder bore through the discharge notch 63, the discharge passage 62 into the discharge port 64 from which the oil is fed to a hydraulic device, not shown.

During the pumping operation of the rotor 48, the coupling disc plate 46 is rotated with the rotor 48 in the clockwise direction, as viewed in FIG. 2. The trailing side 146 of each feed hole 46a, which is at an angle of attack α, is operative to suck the oil from the oil chamber 42 and force the oil axially into the space 46b and thus into the suction passage 60 from which the oil is sucked through the suction notch 61 into the cylinder bores 54 in the manner discussed previously. The quantity of the oil sucked from the suction passage 60 into the cylinder bores 54 during one complete revolution of the rotor 48 is substantially equal to or slightly greater than the quantity of oil pumped by the feed holes 56a into the suction passage 60.

The rate of the discharge of the oil from the pump section 200 is in proportion to the speed of the rotor 48. Thus, when the rotor 48 is rotated at a high speed, the oil is sucked from the suction passage 60 into the cylinder bores at a rate which is higher than in the case where the rotor 48 is rotated at a lower speed. In the prior art pump, when the rate of suction is increased, the oil pressure in the suction passage (60) is reduced, which tends to produce cavitation. This tendency is increased with the decrease in the cross-section of the suction passge (60).

In the described embodiment of the invention, however, the speed of rotation of the coupling disc plate 46 is the same as that of the rotor 48. Thus, if the speed of the rotor 48 is increased, the pumping performance of the feed holes 46a in the coupling disc plate 46 is increased to prevent any decrease in the oil pressure in the suction passage 60. Accordingly, even if the cross-section of the suction passage 60 is designed to be small so as to reduce the size of the pump, the pump is free from cavitation.

In addition, because the oil pressure in the suction passage 60 is not decreased even when the rotor 48 is rotated at a high speed, the plungers 56 can be easily moved radially outwardly (note that the decrease in the suction passage pressure adversely affects the radially outer movements of the plungers 56). Moreover, if the pumping performance of the feed holes 46a is sufficiently high enough to keep the suction passage 60 at an increased pressure, the increased suction passage pressure functions to move the plungers 56 radially outwardly when in suction strokes, whereby the springs for urging the plungers radially outwardly can be eliminated.

As described, the occurence of cavitation can be prevented by simply forming the feed holes 46a obliquely in the coupling disc plate 46 which itself is to transmit the rotation of the electric motor to the rotor 48.

Figure 4:
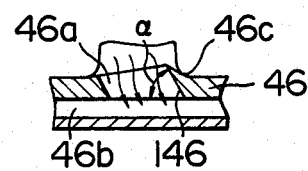
FIG. 4 illustrates a modification to a feed hole shown in FIG. 3.

The pumping performance of the feed holes 46a can be increased by providing a vane-like projection 46c along the edge of the trailing side 146 of each feed hole 46a, as shown in FIG. 4. The angle of attack α can appropriately be selected or determined to satisfy the rate of suction required for a pump.

Figure 5:
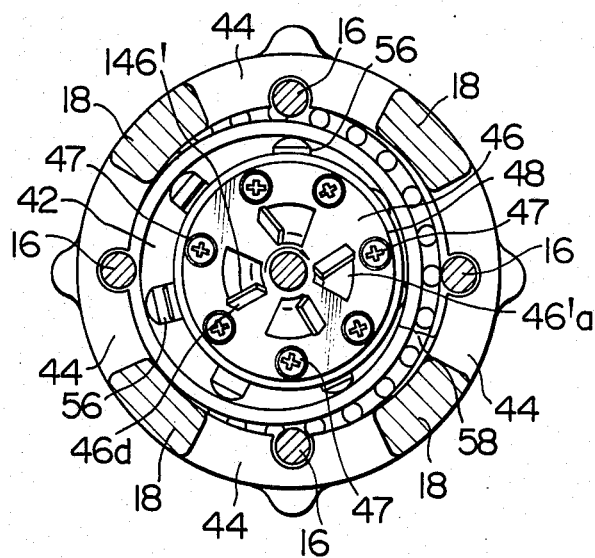
FIG. 5 is a view similar to FIG. 2 but illustrates a second embodiment of the invention which is provided with further modified feed holes.

FIG. 5 shows a modification to the vane-like projection 46c shown in FIG. 4. The modification comprises a tab or vane 46d formed along the trailing edge of each of fan-shaped feed holes 46'a formed in a coupling disc plate 46. The vanes 46d each have an angle of attack α so that, when the coupling disc plate 46 is rotated, the vanes 46d operate to pump the oil axially through the feed holes 46'a into the space 46b and thus into the suction passage 60.

The feed holes may have any shapes other than those shown in the drawings provided that the holes each have a trailing side having a face at an angle of attack α to the plane of the coupling disc plate.

Figure 6:
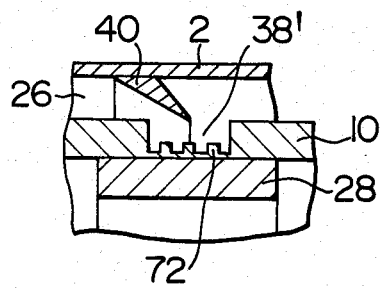
FIGS. 6, 7 and 8 illustrate modified structures for removing foreign particles such as iron particles.

FIG. 6 shows a modified circumferential groove 38' formed in the outer peripheral surface of the motor housing 10. The groove 38' has a bottom provided with a plurality of projections 72 operative not only to provide stagnant regions in the groove 38' but also to increase the surface area of the bottom of the groove so as to improve the efficiency of depositing foreign particles such as fine iron particles.

Figure 7:
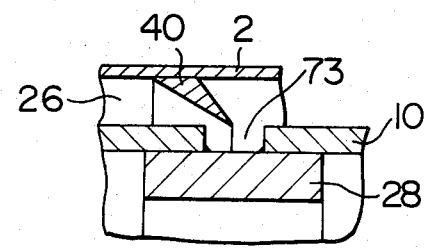

FIG. 7 shows a further modification to the groove. The modification comprises through-holes 73 formed in the peripheral wall of the motor housing 10. The magnets 28 are disposed in the motor housing 10 in alignment with the through-holes 73 and secured to the inner peripheral surface of the motor housing by an adhesive or the like so that the interior of the motor housing 10 is sealed from the through-holes 73. The magnets 28 have radially outer surfaces directly exposed to the through-holes 73 whereby magnetic particles in the flow of oil through the fluid passage can be efficiently magnetically adhered to and deposited on the outer surfaces of the magnets 28 exposed to the through-holes 73.

Figure 8:
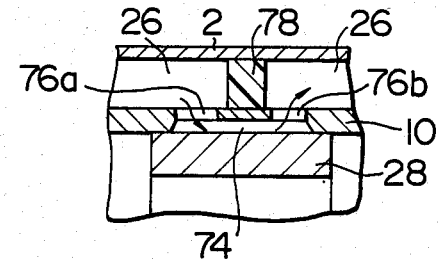

FIG. 8 shows a still further modification which comprises a circumferential groove 74 formed in the inner peripheral surface of the motor housing 10 and disposed in alignment with the magnets 28 secured to the inner peripheral surface of the motor housing 10. Axially spaced through-holes 76a and 76b are formed in the peripheral wall of the motor housing 10 and communicated with the groove 74. A circumferential partition wall 78 of oil-resistant rubber is disposed between the axially spaced through-holes 76a and 76b and radially extends between the motor housing 10 and the outer housing 2 to positively guide the flow of oil from the fluid passage 26 through the through-hole 76a into the groove 74 and then through the through-hole 76b back into the axial passage 26 whereby foreign magnetic particles such as iron particles are magnetically adhered to the radially inner bottom of the groove 74 provided by the radially outer surfaces of the magnets 28.

It will be apparent to those in the art that the permanent magnets 28 may alternatively be electro- magnets.

What is claimed is:

1. A motor-driven radial plunger pump including:
an outer housing provided with fluid inlet and outlet;

a motor section including a motor housing so disposed in said outer housing as to cooperate therewith to define a fluid passage therebetween and an electric motor disposed in said motor housing;

said fluid inlet being communicated with said fluid passage;

a pump section including a pump housing disposed in said outer housing, a rotor disposed in said pump housing, a coupling member drivingly coupling said motor to said rotor, a plurality of radial cylinder bores in said rotor, plungers disposed in said cylinder bores for sliding movement therein, respectively, so that the radially inner ends of said plungers cooperate with associated cylinder bores to define variable volume chambers, a suction passage means communicated with said fluid passage and adapted to be communicated with successive variable volume chambers when in suction strokes, and a discharge passage communicated with said fluid outlet in said outer housing and adapted to be communicated with successive variable volume chambers when in discharge strokes; and a filter element disposed in said fluid passage upstream of said pump section.

2. A motor-driven radial plunger pump including:

an outer housing provided with fluid inlet and outlet;

a motor section including a motor housing so disposed in said outer housing as to cooperate therewith to define a fluid passage therebetween and an electric motor disposed in said motor housing;

said fluid inlet being communicated with said fluid passage; and a pump section including a pump housing disposed in said outer housing, a rotor disposed in said pump housing, a coupling member drivingly coupling said motor to said rotor, a plurality of radial cylinder bores in said rotor, plungers disposed in said cylinder bores for sliding movement therein, respectively, so that the radially inner ends of said plungers cooperate with associated cylinder bores to define variable volume chambers, a suction passage means communicated with said fluid passage and adapted to be communicated with successive variable volume chambers when in suction strokes, and a discharge passage communicated with said fluid outlet in said outer housing and adapted to be communicated with successive variable volume chambers when in discharge strokes, said coupling member being so shaped as to provide feed holes disposed between said fluid passage and said suction passage and being rotatable with said rotor and said feed holes each being provided with means for positively feeding the working fluid from said fluid passage into said suction passage.

3. A motor-driven radial plunger pump according to claim 2, wherein said positively feeding means comprises a surface provided at the trailing side of an associated feed hole at an angle of attack relative to a plane in which said coupling member is rotated.

4. A motor-driven radial plunger pump including:

an outer housing provided with fluid inlet and outlet;

a motor section including a motor housing so disposed in said outer housing as to cooperate therewith to define a fluid passage therebetween and an electric motor disposed in said motor housing, said electric motor including magnets secured to the inner peripheral surface of said motor housing;

said fluid inlet being communicated with said fluid passage; and a pump section including a pump housing disposed in said outer housing, a rotor disposed in said pump housing, a coupling member drivingly coupling said motor to said rotor, a plurality of radial cylinder bores in said rotor, plungers disposed in said cylinder bores for sliding movement therein, respectively, so that the radially inner ends of said plungers cooperate with associated cylinder bores to define variable volume chambers, a suction passage means communicated with said fluid passage and adapted to be communicated with successive variable volume chambers when in suction strokes, and a discharge passage communicated with said fluid outlet in said outer housing and adapted to be communicated with successive variable volume chambers when in discharge strokes, said pump further including means in said fluid passage for removing, by the magnetic force of said magnets, magnetic particles contained in the flow of said working fluid through said fluid passage.

5. A motor-driven radial plunger pump according to claim 4, further including a filter element disposed in said fluid passage downstream of said magnetic particle removing means for removing foreign particles residual in the flow of said fluid downstream of said magnetic particle removing means.

6. A motor-driven radial plunger pump according to claim 5, wherein said magnetic particle removing means comprises a recess disposed adjacent to said magnets and communicated with said fluid passage and a guide member in said fluid passage for causing the fluid to flow into and out of said recess.

7. A motor-driven radial plunger pump according to claim 6, wherein said recess comprises a groove formed in the inner peripheral surface of said motor housing and communicated with said fluid passage through axially spaced through-holes formed in the peripheral wall of said pump housing, said groove being radially inwardly closed by said magnets, and wherein said guide member comprises an annular sealing member disposed in said fluid passage between said axially spaced through-holes and radially extending between said outer housing and said motor housing.

8. A motor-driven radial plunger pump according to claim 6, wherein said recess comprises a groove formed in the outer peripheral surface of said motor housing and extending in the circumferential direction thereof.

9. A motor-driven radial plunger pump according to claim 8, wherein said groove has a bottom face with projections formed thereon.

* * * * *